(No Model.)  4 Sheets—Sheet 1.
J. WEHRLIN.
SOLDERING MACHINE.
No. 489,618. Patented Jan. 10, 1893.
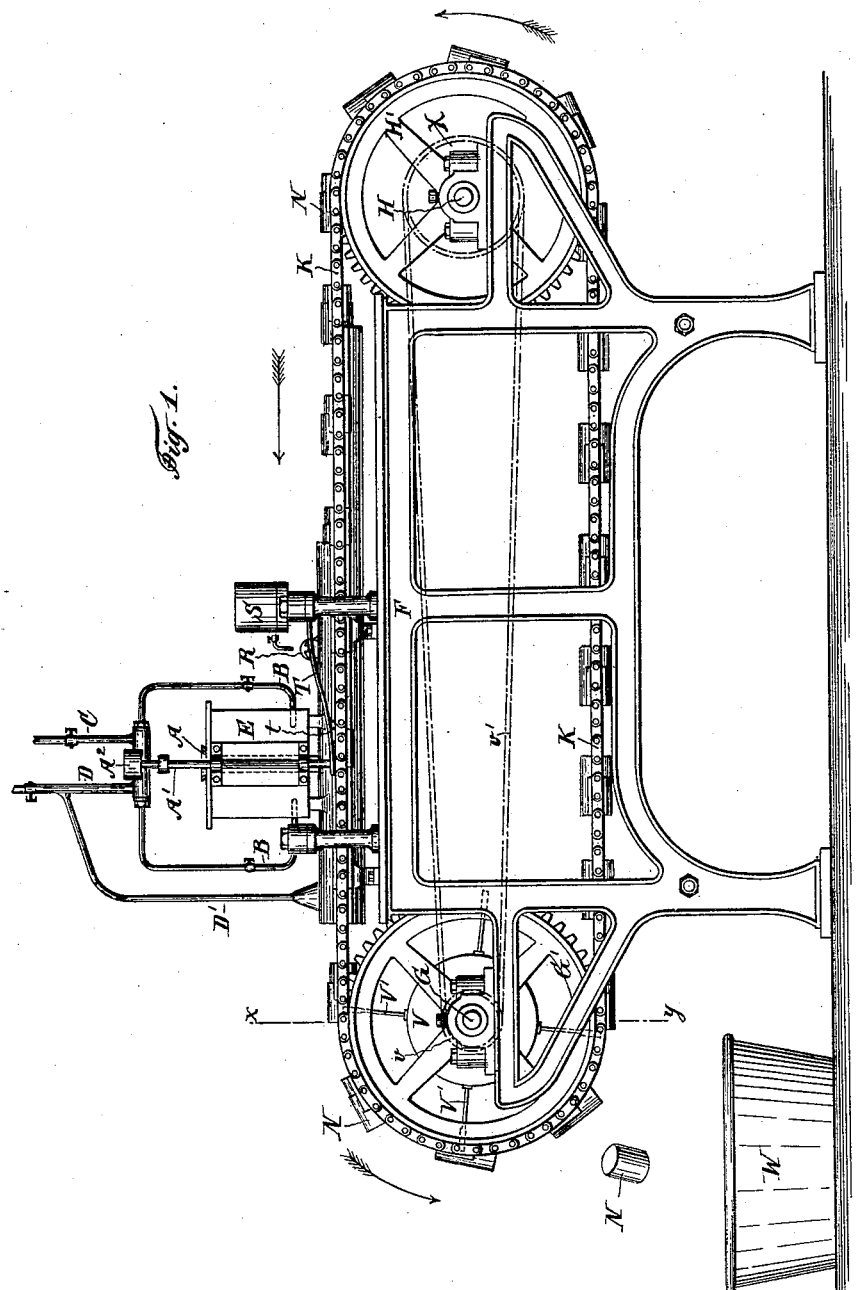
Witnesses
Chas. H. Smith
J. Staib
Inventor
Jacques Wehrlin
per Lemuel W. Serrell
Atty (No Model.) 4 Sheets—Sheet 2.
J. WEHRLIN.
SOLDERING MACHINE.
No. 489,618. Patented Jan. 10, 1893.
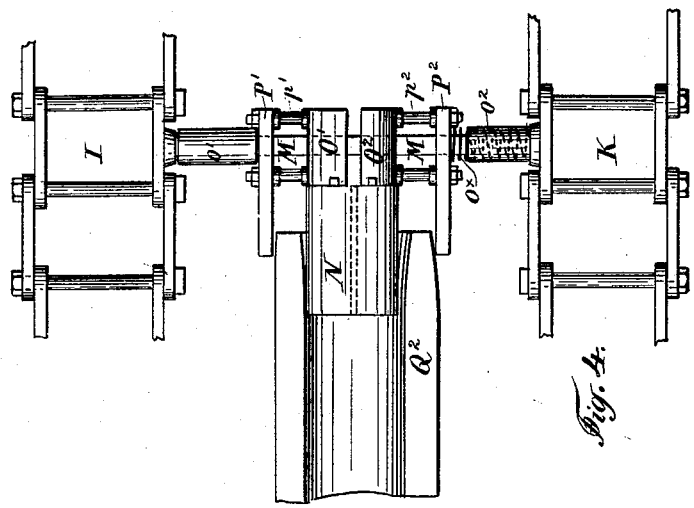
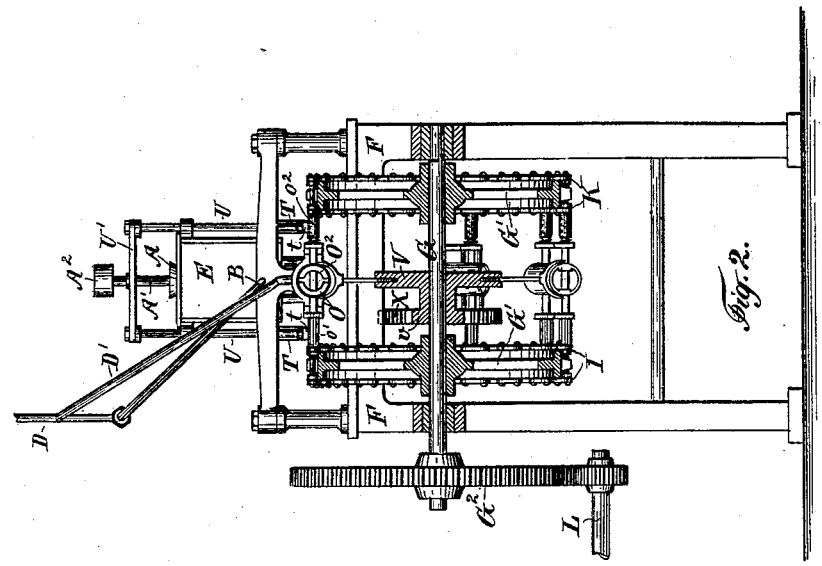

(No Model.) 4 Sheets—Sheet 3.
J. WEHRLIN.
SOLDERING MACHINE.
No. 489,618. Patented Jan. 10, 1893.
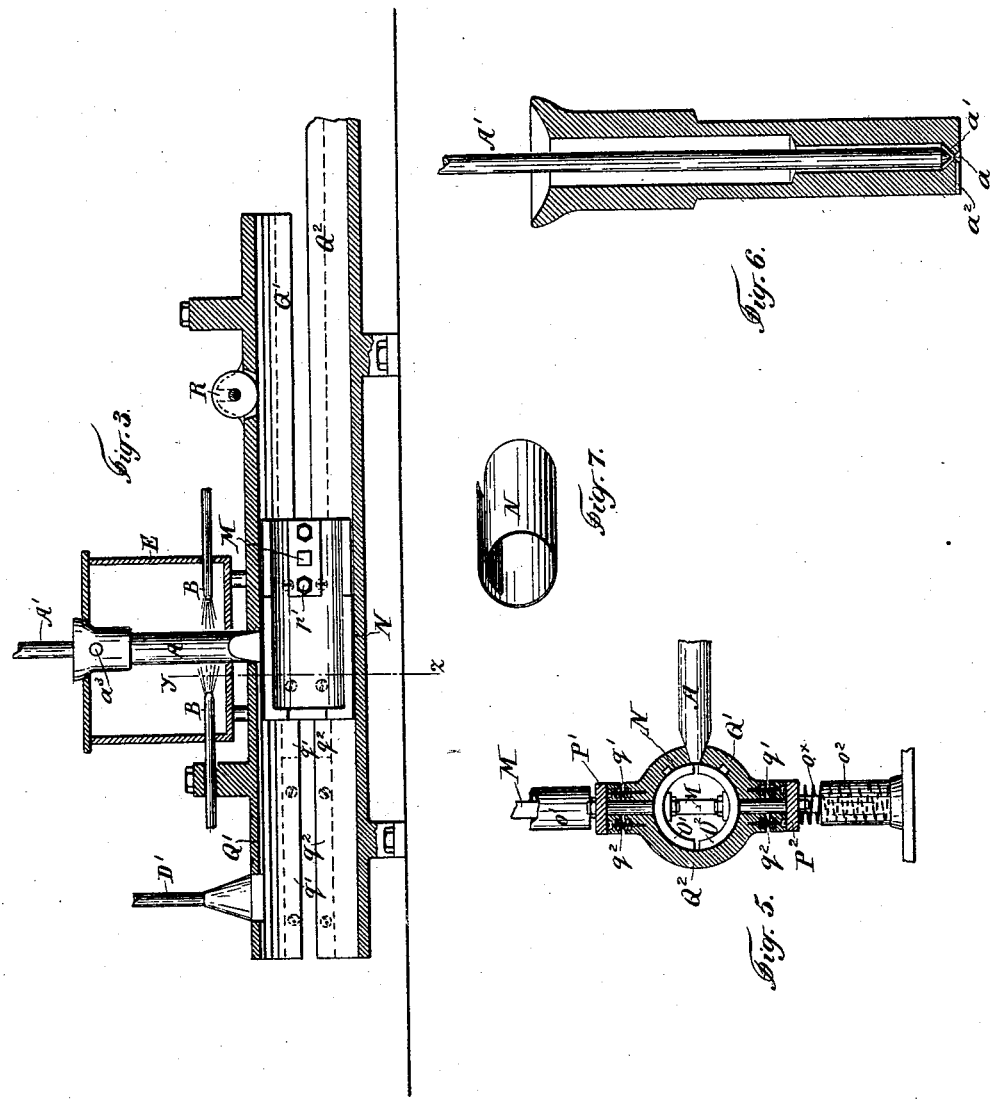

(No Model.) 4 Sheets—Sheet 4.
J. WEHRLIN.
SOLDERING MACHINE.
No. 489,618. Patented Jan. 10, 1893.
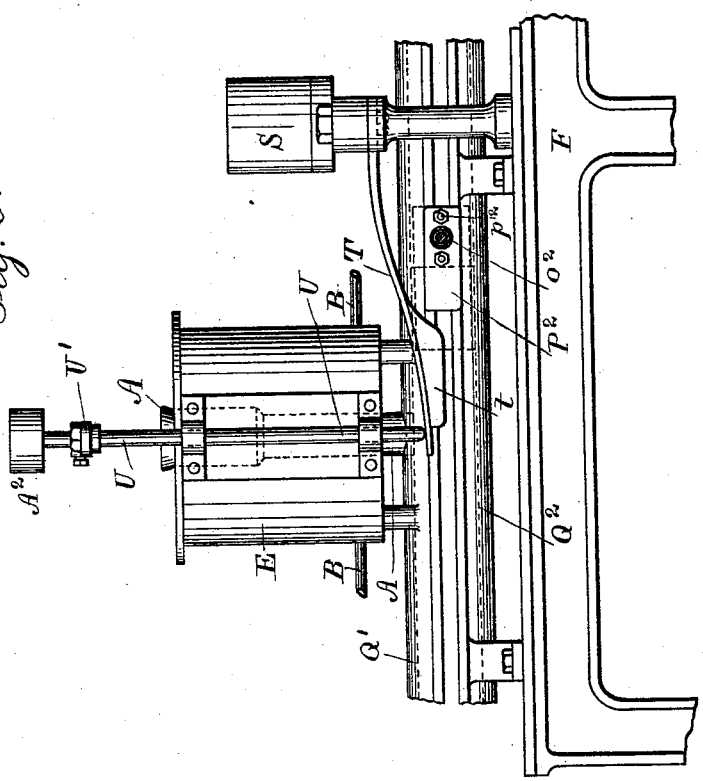
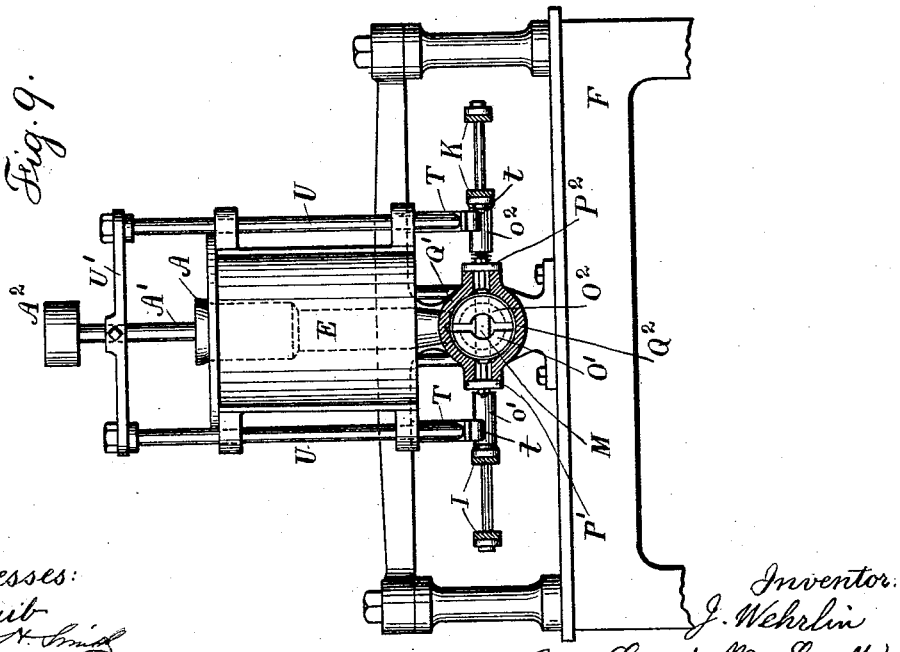
THE NORRIS PETERS CO., PHOTO-LITHO., WASHINGTON, D. C.

UNITED STATES PATENT OFFICE.

JACQUES WEHRLIN, OF VEVAY, SWITZERLAND.

SOLDERING-MACHINE.

SPECIFICATION forming part of Letters Patent No. 489,618, dated January 10, 1893.

Application filed December 26, 1891. Serial No. 416,265. (No model.)

*To all whom it may concern:*

Be it known that I, JACQUES WEHRLIN, mechanician, residing at Vevay, Switzerland, have invented certain new and useful Improvements in Soldering-Machines, of which the following is a specification.

The invention essentially consists of an apparatus working like a soldering iron, but in a continuous and automatic manner, and having the solder contained in a suitable cavity of itself and fed continuously or not upon the pieces which are to be soldered, being maintained in a fluid state by any suitable means whatever. The said apparatus may be combined with any suitable means for feeding the pieces which are to be soldered to the soldering iron, for the soldering purpose.

The following specification relates to the combination of the above mentioned soldering apparatus with means for soldering the tubular portion of cylindrical tin boxes.

Figure 1 is a front elevation of the whole machine and Fig. 2 a vertical section of the line x, y, in Fig. 1. Fig. 3 is a vertical section, at an enlarged scale, of the channel or casing in which the soldering process takes place. Fig. 4 is a plan view of the right end of said channel or casing and of one of the clamps bearing the tin boxes to be soldered. Fig. 5 is a section on the line y, z, in Fig. 3. Fig. 6 is an axial section of the soldering iron. Fig. 7 shows a tubular portion of a cylindrical tin box as it is formed by means of another machine, before being placed into my improved soldering machine. Fig. 8 is a side elevation, and Fig. 9 an end elevation of the devices for operating the discharge of the fluid solder. These figures are of exaggerated size.

In all figures the same letters refer to the same parts.

The soldering iron (Figs. 3 and 6) is composed of a hollow cylinder A the lower end of which is shaped in the machine shown as soldering hammers are generally shaped. But the shape of the soldering iron may vary according to the form or shape of the pieces which are to be soldered. The interior of the cylinder A contains the solder which is maintained in fluid state by means of two or more suitable blow-pipes B. The solder flows out of the cylinder A through a small hole $a$ formed at the intersection point or union of two oppositely placed conical recesses. The hole $a$ thus formed is not bordered by any cylindrical surface but formed of sharp circular edges.

In the axis of the hollow cylinder A there is provided a rod A′ having a conical end $a'$, which plays like a valve to shut the hole $a$, as long as said rod A′ is firmly pressed toward the bottom of the cylinder A. Hence, if the rod A′ is lifted by any means whatever, the fluid solder contained in the cylinder A will flow out of it, through the opening $a$, as long as the said rod A′ is lifted, and the solder will cease to flow out of the cylinder A as soon as the rod A′ is again pressed down. To aid in allowing the solder to easily flow out on the object which is to be soldered the lower surface of the soldering iron A may further be provided with a recess $a^2$.

The blow-pipes B are on one hand connected with a gas pipe C and on the other hand with a pipe D of compressed air.

E is a casing surrounding the soldering iron, A and the blow-pipes B for preventing the heat being lost by radiancy.

The described soldering apparatus is fixed to the frame F of the machine. The cylinder A is preferably supported by means of two pivots $a^3$, resting upon suitable bearings disposed so as to control the height of suspension of the cylinder or soldering iron A over the piece which is to be soldered. The tubular portion N of the cylindrical tin boxes for the soldering of which the machine shown in the accompanying drawings has been invented, are caused to pass beneath the above described soldering iron or cylinder A and to be soldered, cooled, and transported out of the machine, by the means and in the manner described below. Two endless chains I and K run over corresponding chain wheels G′ and H′ which are fixed upon the shafts G and H that pass across and have bearings upon the frame F. The chains I and K are moved in the direction indicated by an arrow in Fig. 1, the shaft G having a gear wheel $G^2$ which is acted upon by a driving pinion L. These chains I and K are connected to one another by means of equidistant square bolts or traverses M (Fig. 4), bearing the clutches intended to hold the tubes N, which are to be soldered, and to carry the same along under the above described soldering iron A. The tubes N are rolled to the form, shown in Fig. 7 by means of a machine which does not belong to the invention claimed and needs therefore not to be described. These tubes are put by hand over the clutches O', O² of the machine, at the right end of the latter, as shown in Fig. 1. The aforesaid clutches are composed of two half clutches O' and O², having sliding plates P' and P² connected to them by means of bolts $p'$ and $p^2$. The square bolt M traverses the clutches O' and O² and holds the latter always in the direction in which the chains are running. The clutch O' and its plate P' are maintained at a suitable distance from the chain I by means of a tube $o'$ and the clutch O² and its plate P² are pressed toward the clutch O' by means of a suitable spring $o^\times$ contained in the tube $o^2$, whereby the clutches O', O² form a cylinder of a slightly smaller size than that of the tubes N which are to be soldered by the machine, these tubes are therefore easily placed on these clutches O', O². According to the motion of the chains I and K the clutches O' O² and the tubes N fixed thereon are carried into the cylindrical channel formed by the half cylinders Q' and Q², the inner diameter of which is exactly the same as the outer diameter of the tubes N which are to be soldered. These tubes N must therefore be pressed against the inner walls of the half cylinders Q' and Q² and this is obtained by means of the plates P' and P² sliding on suitable wedge-shaped exterior faces of the half cylinders Q', Q². Such wedge-shaped exterior faces cause the clutches O', O² to be disjoined and the spring $o^\times$ to be compressed, so as to have the clutches O', O² pressing the tube N against the inner cylindrical walls of the half cylinders.

Now, as I am aware that the thickness of the tin plates used in the manufacture of the tubes N will not be always perfectly the same, I further provide on the exterior faces of the half cylinders Q', Q² suitable guiding blades $q'$ and $q^2$ acted upon by suitable springs, and on which the plates P' and P² are caused to slide, and which cause the clutches O' and O² to constantly and firmly press the tube N against the inner walls of the half cylinders Q' and Q² whatever the thickness of the tubes N may be. The blades $q'$ and $q^2$ are divided into lengths corresponding to the lengths of the plates P' and P² so as to act only upon one pair of such plates at a time. The tubes N, formed as shown in Fig. 4, are placed as already specified, upon the clutches O', O² at the right end of the machine and turned so as to have the joint which is to be soldered upward. When entering the channel between the half cylinders Q', Q² the clutches O' O² are disjoined as specified above, and the tube N pressed against the inner walls of the half cylinders Q' Q². The bolt or traverse M, as well as the bolts $p'$ and $p^2$ pass between the half cylinders Q' Q². In its course through the half cylinders Q' Q² the tube N meets first a felt roller R which is lodged into a suitable outcut or recess of the half cylinder Q' and bears under the action of its own weight, upon the tubes N carried beneath it. Said felt roller R is wet with chlorate of zinc or its equivalent dropping upon it out of a suitable tank S. Thus the tube N is wet in the course of its passage through the half cylinders Q' Q², with chlorate of zinc or the like on the whole length of the joint which is to be soldered, without any risk of having such chlorate of zinc introduced into the interior of the tube N.

In Fig. 3 the tube N is shown at the moment in which it is passing beneath the soldering iron or cylinder A. At the very moment when the front of said tube N has reached the soldering iron or cylinder A the tubes $o'$ and $o^2$ meet the projections $t$ on the under side of the two supporting arms T T, upon which arms bear the rods U of a cross piece U' connected to the above mentioned rod A' which plays like a valve to control the flow of the melted solder contained in the cylinder A. The rod A' is pressed down by means of a weight A² fixed to its top and raised by means of the supporting arms T T and rods U U and cross piece U' when the tubes $o'$ $o^2$ meet the projections $t$ of these arms T. The projections $t$ have a straight lower edge so as to maintain the rod A' at a uniform height as lifted, that is to say, so that the solder flows out of the cylinder A steadily and in the desired quantity, as long as the tube N is passing beneath the hole $a$ of said cylinder A. The solder which flows upon the joint of the tube N is then equalized and smoothed by the back portion of the solder cylinder A during its further passage beneath the latter. After the joint is soldered and smoothed, the tube N is carried along on the clutches O' O² through the end portion of the cylindrical channel to which are connected the blades $q'$ $q^2$, and upon the half cylinder Q' of which channel is located the branch D' of the tube D. At this point as hereinbefore stated, the blades $q'$ $q^2$ act upon the clutches O' O² to press the tube N against the inner walls of the half cylinders Q' Q², thus expanding and causing all the tubes N to be of equal size. Simultaneously with this compressed air is introduced through the branch D' of the tube D within the half cylinders upon the soldered joint which causes the solder to set and cool before the tube N leaves the machine. The shaft G bears a loose disk V to which is affixed a chain wheel $v$ over which passes an endless chain $v'$ acted upon by a chain wheel X fixed to the axis H. The chain wheel $v$ being of smaller diameter than the chain wheel X the disk V will be caused to rotate with greater speed than the chain wheels G' and H', but in the same direction of rotation. Now the disk V being provided with suitably forked arms V' the latter are so disposed as to meet with the back of the soldered tubes N when they reach the left end of the machine as shown in Fig. 1, and to throw said tubes into a suitable case W.

I claim as my invention:

1. In a soldering machine, a solder receiving iron or cylinder having a solder delivery opening $a$ and a longitudinal face channel $a^2$ in the edge of the iron communicating with and extending outwardly from said opening and being in the path of the soldered joint for delivering the melted solder thereon, and a rod A' working as a valve to close the opening $a$, substantially as set forth.

2. In a soldering machine, the combination with the soldering iron or cylinder A having an opening $a$, of the rod A', the rods U, the cross piece U' and mechanism for periodically acting upon the said parts to allow the melted solder contained in the hollow cylinder A to flow out of the opening $a$, substantially as shown and described.

3. In a soldering machine, the combination of the endless chains I and K, the square bolts M, half cylindrical clutches O' O² connected therewith and the plates P' P² connected therewith for the purpose of carrying the tubular pieces N, which are to be soldered, and the half cylinders Q' and Q² between which and on the clutches O' O² the tubular pieces N are carried, substantially as shown and described.

4. In a soldering machine, the combination with the soldering iron or cylinder A, having an opening $a$, of the rod A', the cross piece U' and rods U connected therewith, the supporting arms T T having projections $t\ t$, the endless chains I and K and the cylinders $o'$ $o^2$ for periodically lifting the rod A', substantially as and for the purposes set forth.

5. In a soldering machine, the combination with the endless chains I and K, their chain wheels G' and H' and their shafts G and H, of a loose disk V upon the axis G bearing a chain wheel $v$, the chain wheel X upon the axis H, an endless chain $v'$ passing around and moving with the wheels $v$ and X, and the forked arms V' upon the disk V, as and for the purpose specified.

In testimony whereof I have signed my name to this specification in the presence of two subscribing witnesses.

JACQUES WEHRLIN. [L. S.]

Witnesses:
P. GIROD,
AD. BONJOUR.